US009169391B2

(12) United States Patent
Yang et al.

(10) Patent No.: US 9,169,391 B2
(45) Date of Patent: Oct. 27, 2015

(54) POLYCARBONATE COMPOSITION

(75) Inventors: Jian Yang, Shanghai (CN); Andries J. P. Van Zyl, Bergen op Zoom (NL); Robert Dirk Van de Grampel, Tholen (NL); Jong-Min Choi, SungNam (KR)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 13/983,084

(22) PCT Filed: May 16, 2012

(86) PCT No.: PCT/CN2012/075575
§ 371 (c)(1),
(2), (4) Date: Aug. 14, 2013

(87) PCT Pub. No.: WO2013/170456
PCT Pub. Date: Nov. 21, 2013

(65) Prior Publication Data
US 2015/0079375 A1    Mar. 19, 2015

(51) Int. Cl.
*C08L 67/00* (2006.01)
*C08L 69/00* (2006.01)
*C08K 7/14* (2006.01)
C08K 3/22 (2006.01)
C08G 77/448 (2006.01)

(52) U.S. Cl.
CPC .............. *C08L 69/005* (2013.01); *C08K 7/14* (2013.01); *C08G 77/448* (2013.01); *C08K 2003/2241* (2013.01); *C08L 2205/02* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | | | |
|---|---|---|---|---|
| 3,189,662 A | * | 6/1965 | Vaughn, Jr. | 528/33 |
| 4,027,072 A | * | 5/1977 | Molari, Jr. | 428/412 |
| 4,487,896 A | * | 12/1984 | Mark et al. | 525/439 |
| 5,360,861 A | * | 11/1994 | Campbell | 524/494 |
| 6,399,737 B1 | | 6/2002 | Elkovitch | |
| 7,119,140 B2 | | 10/2006 | Basham et al. | |
| 2006/0002814 A1 | | 1/2006 | Chatterjee et al. | |
| 2007/0105994 A1 | | 5/2007 | Li et al. | |
| 2008/0119596 A1 | | 5/2008 | Agawal et al. | |
| 2008/0230751 A1 | | 9/2008 | Li et al. | |
| 2010/0129649 A1 | | 5/2010 | Malinoski et al. | |
| 2012/0184662 A1 | | 7/2012 | Van Der Mee et al. | |
| 2013/0309474 A1 | | 11/2013 | Peek et al. | |

FOREIGN PATENT DOCUMENTS

| | | |
|---|---|---|
| WO | 0245098 A2 | 6/2002 |
| WO | 2010006226 A1 | 1/2010 |
| WO | 2012160540 A1 | 11/2012 |
| WO | 2013170452 A1 | 11/2013 |

OTHER PUBLICATIONS

International Search Report and the Written Opinion of the International Searching Authority for PCT/CN2012/075575 mailed Feb. 28, 2013, 14 pages.
International Search Report and the Written Opinion of the International Searching Authority for PCT/CN2012/075562 mailed Feb. 28, 2013, 14 pages.
International Search Report of the International Searching Authority for PCT/IB2013/054018, mailed Aug. 19, 2013, 4 pages.
Written Opinion of the International Searching Authority for PCT/IB2013/054018, mailed Aug. 19, 2013, 5 pages.
International Preliminary Report on Patentability for International Application No. PCT/CN2012/075575, Application Filing Date May 16, 2012, Date of Mailing Nov. 27, 2014, 7 pages.

* cited by examiner

*Primary Examiner* — Marc Zimmer
(74) *Attorney, Agent, or Firm* — Cantor Colburn LLP

(57) ABSTRACT

A composition includes at least one poly(aliphatic ester)-polycarbonate copolymer, a polysiloxane-polycarbonate copolymer, and glass fibers. The composition exhibits good flow, aesthetic, and impact properties.

67 Claims, No Drawings

POLYCARBONATE COMPOSITION

This application is a national stage application of PCT/CN2012/075575 filed on May 16, 2012, which is hereby incorporated by reference in its entirety.

BACKGROUND

The present disclosure relates generally to polycarbonate compositions that have good flow properties, high impact properties, and good aesthetic values. Also disclosed herein are methods for preparing and/or using the same.

Polycarbonates (PC) are synthetic engineering thermoplastic resins derived from bisphenols and phosgene, or their derivatives. They are linear polyesters of carbonic acid and can be formed from dihydroxy compounds and carbonate diesters or carbonyl halides, or by ester interchange. Polycarbonates are a useful class of polymers having many beneficial properties.

The consumer electronics market has grown significantly in recent years. Recent designs aim for slimness, with thinner walls and with wide and large display panels. Known compositions used for such mobile devices (e.g. mobile phones) may exhibit brittleness and/or cracking, unsightly surfaces, and/or poor flowability.

Due to various "critical to quality" requirements of customers, there is a need for polycarbonate compositions that have good flow properties, aesthetic properties, and impact properties combined with stiffness.

BRIEF DESCRIPTION

Disclosed herein are various compositions that exhibit good flow, aesthetic, and impact properties. The compositions generally include at least one poly(aliphatic ester)-polycarbonate copolymer, a polysiloxane-polycarbonate copolymer, and glass fibers.

Disclosed in some embodiments is a composition comprising: a first poly(aliphatic ester)-polycarbonate copolymer; a polysiloxane-polycarbonate copolymer; and glass fibers; wherein the first poly(aliphatic ester)-polycarbonate copolymer has a weight average molecular weight of from about 15,000 to about 40,000. The polysiloxane-polycarbonate copolymer is present in an amount less than the weight percentage of the first poly(aliphatic ester)-polycarbonate copolymer. The composition has a flexural modulus measured according to ISO 178 of at least 3000 MPa.

An ester repeat unit of the first poly(aliphatic ester)-polycarbonate copolymer may be derived from sebacic acid.

The composition may contain up to about 65 wt %, or up to about 75 wt %, of the first poly(aliphatic ester)-polycarbonate copolymer.

The composition can sometimes further comprise a second poly(aliphatic ester)-polycarbonate copolymer, wherein a weight average molecular weight of the second poly(aliphatic ester)-polycarbonate copolymer is greater than a weight average molecular weight of the first poly(aliphatic ester)-polycarbonate copolymer. The composition may have a melt volume rate measured according to ASTM D1238 of at least 4 cm$^3$/10 min. The weight ratio of the first poly(aliphatic ester)-polycarbonate copolymer to the second poly(aliphatic ester)-polycarbonate copolymer may be at least 2:1, or at least 4:1. The second poly(aliphatic ester)-polycarbonate copolymer may have a weight average molecular weight of from about 30,000 to about 40,000. The first poly(aliphatic ester)-polycarbonate copolymer may have a weight average molecular weight of from about 15,000 to about 25,000 when the second poly(aliphatic ester)-polycarbonate copolymer is present. The composition may comprise from about 15 to about 75 wt % of the first poly(aliphatic ester)-polycarbonate copolymer. The composition may comprise from about 5 to about 50 wt % of the second poly(aliphatic ester)-polycarbonate copolymer.

The composition may contain from about 5 to about 35 wt % of the glass fibers.

The composition may exhibit a gloss measured according to ASTM D2457 (at 60°) of at least 40.

In particular embodiments, the composition exhibits a flexural modulus measured according to ISO 178 of at least 3000 MPa; a melt volume rate measured according to ASTM D1238 of at least 4 cm$^3$/10 min; and a notched Izod impact strength measured according to ASTM D256 of at least 150 J/m.

In other embodiments, the composition exhibits a melt volume rate measured according to ASTM D1238 of at least 4 cm$^3$/10 min; a flexural modulus measured according to ISO 178 of at least 3000 MPa; and a notched Izod impact strength measured according to ASTM D256 of from about 150 J/m to about 300 J/m.

In other particular embodiments, the composition exhibits a melt volume rate measured according to ASTM D1238 of at least 4 cm$^3$/10 min; a flexural modulus measured according to ISO 178 of at least 3000 MPa; and a notched Izod impact strength measured according to ASTM D256 of at least 200 J/m.

In yet other embodiments, the composition exhibits a melt volume rate measured according to ASTM D1238 of at least 4 cm$^3$/10 min; a flexural modulus measured according to ISO 178 of at least 3500 MPa; and a notched Izod impact strength measured according to ASTM D256 of at least 250 J/m.

In still some other embodiments, the composition exhibits a melt volume rate measured according to ASTM D1238 of at least 9 cm$^3$/10 min; a flexural modulus measured according to ISO 178 of at least 3000 MPa; and a notched Izod impact strength measured according to ASTM D256 of at least 250 J/m.

The composition may contain from about 5 to about 25 wt % of the polysiloxane-polycarbonate copolymer.

The aliphatic ester may be derived from an aliphatic dicarboxylic acid that has a total of from 8 to 12 carbon atoms, such as sebacic acid.

The first poly(aliphatic ester)-polycarbonate copolymer may contain from about 2 to about 13 mol % of aliphatic ester units. The first poly(aliphatic ester)-polycarbonate copolymer may contain from about 87 to about 98 mol % of carbonate units derived from bisphenol-A. The aliphatic ester units can be derived from sebacic acid.

The siloxane block chain length of the polysiloxane-polycarbonate copolymer may be from about 30 to about 100, such as from about 35 to about 55. The polysiloxane-polycarbonate copolymer may have a siloxane block content of from greater than zero to about 25 wt %, including from about 15 wt % to about 25 wt %. The composition alternatively may have a total softblock content of less than 3.5 wt %. In other embodiments, the composition comprises from about 0.5 wt % to about 6 wt % of siloxane originating from the polysiloxane-polycarbonate copolymer.

The glass fibers used in the polycarbonate composition may more specifically be non-bonding glass fibers.

Also disclosed are articles made from such compositions where the article has a wall with a thickness of at least 0.3 mm and less than 1 mm. The wall thickness may be, for example, from 0.3 mm to 0.5 mm. The article can be part of a cellphone, a MP3 player, a computer, a laptop, a camera, a video recorder, an electronic tablet, a hand receiver, a kitchen appliance, or an electrical housing.

Disclosed in additional embodiments is a composition comprising: a first poly(aliphatic ester)-polycarbonate copolymer; a second poly(aliphatic ester)-polycarbonate copolymer; a polysiloxane-polycarbonate copolymer; and glass fibers; wherein the first poly(aliphatic ester)-polycarbonate copolymer has an weight average molecular weight of from about 15,000 to about 25,000; and wherein the second poly(aliphatic ester)-polycarbonate copolymer has an weight average molecular weight of from about 30,000 to about 40,000. The polysiloxane-polycarbonate copolymer is present in an amount less than the combined weight percentage of the first and second poly(aliphatic ester)-polycarbonate copolymers. The composition has a flexural modulus measured according to ISO 178 of at least 3000 MPa.

The first poly(aliphatic ester)-polycarbonate copolymer and the second poly(aliphatic ester)-polycarbonate copolymer may both include ester units derived from sebacic acid.

The composition may comprise from about 55 to about 85 wt % of the first poly(aliphatic ester)-polycarbonate copolymer and the second poly(aliphatic ester)-polycarbonate copolymer.

A weight ratio of the first poly(aliphatic ester)-polycarbonate copolymer to the second poly(aliphatic ester)-polycarbonate copolymer may be from about 3:2 to about 15:1, or from about 2:1 to about 4:1.

The first poly(aliphatic ester)-polycarbonate copolymer may contain from about 4 to about 7 mol % of aliphatic ester units. The first poly(aliphatic ester)-polycarbonate copolymer may contain from about 93 to about 96 mol % of carbonate units derived from bisphenol-A. The aliphatic ester units can be derived from sebacic acid.

The second poly(aliphatic ester)-polycarbonate copolymer may contain from about 7 to about 13 mol % of aliphatic ester units. The second poly(aliphatic ester)-polycarbonate copolymer may contain from about 87 to about 93 mol % of carbonate units derived from bisphenol-A. The aliphatic ester units can be derived from sebacic acid.

Both the first poly(aliphatic ester)-polycarbonate copolymer and the second poly(aliphatic ester)-polycarbonate copolymer can contain aliphatic ester units derived from sebacic acid and carbonate units derived from bisphenol-A.

Also disclosed in various embodiments is a composition comprising: from about 35 wt % to about 75 wt % of a first poly(aliphatic ester)-polycarbonate copolymer having a weight average molecular weight of from about 15,000 to about 25,000; from about 5 wt % to about 30 wt % of a second poly(aliphatic ester)-polycarbonate copolymer having a weight average molecular weight of from about 30,000 to about 40,000; from about 9 wt % to about 20 wt % of a polysiloxane-polycarbonate copolymer; and from about 10 wt % to about 20 wt % of non-bonding glass fibers. The first poly(aliphatic ester)-polycarbonate copolymer and the second poly(aliphatic ester)-polycarbonate copolymer both comprise ester units derived from sebacic acid. The composition exhibits a gloss measured according to ASTM D2457 (at) 60° of at least 40.

In particular embodiments, the composition exhibits a melt volume rate measured according to ASTM D1238 of at least 2 cm$^3$/10 min; a flexural modulus measured according to ISO 178 of at least 3000 MPa; a notched Izod impact strength measured according to ASTM D256ASTM D256 of at least 90 J/m; and a gloss measured according to ASTM D2457 (at 60°) of at least 40.

The composition may comprise from about 50 to about 65 wt % of the first poly(aliphatic ester)-polycarbonate copolymer.

The weight ratio of the first poly(aliphatic ester)-polycarbonate copolymer to the second poly(aliphatic ester)-polycarbonate copolymer may be from about 3:2 to about 15:1, including from about 2:1 to about 4:1.

Also disclosed are compositions comprising: a first poly(aliphatic ester)-polycarbonate copolymer having a weight average molecular weight of from about 15,000 to about 40,000; a polysiloxane-polycarbonate copolymer present in an amount less than the weight percentage of the first poly(aliphatic ester)-polycarbonate copolymer; and glass fibers; wherein the composition has a flexural modulus measured according to ISO 178 of at least 3000 MPa; and wherein the composition exhibits a gloss measured according to ASTM D2457 (at 60°) of at least 40.

The composition may contain from about 10 wt % to about 20 wt % of the glass fibers. The composition may alternatively exhibit a gloss measured according to ASTM D2457 (at 60°) of at least 60.

The composition may further comprise a second poly(aliphatic ester)-polycarbonate copolymer; wherein the first poly(aliphatic ester)-polycarbonate copolymer has a weight average molecular weight of from about 15,000 to about 25,000; wherein the second poly(aliphatic ester)-polycarbonate copolymer has a weight average molecular weight of from about 30,000 to about 40,000; and wherein the polysiloxane-polycarbonate copolymer is present in an amount less than the combined weight percentage of the first and second poly(aliphatic ester)-polycarbonate copolymers.

The composition can exhibit a flexural modulus measured according to ISO 178 of at least 3000 MPa; a gloss measured according to ASTM D2457 (at 60°) of at least 40; a melt volume rate measured according to ASTM D1238 of at least 4 cm$^3$/10 min; and a notched Izod impact strength measured according to ASTM D256 of at least 150 J/m.

The composition can alternatively exhibit a melt volume rate measured according to ASTM D1238 of at least 4 cm$^3$/10 min; a flexural modulus measured according to ISO 178 of at least 3500 MPa; a notched Izod impact strength measured according to ASTM D256 of at least 250 J/m; and a gloss measured according to ASTM D2457 (at 60°) of at least 40.

In other embodiments, the composition exhibits a melt volume rate measured according to ASTM D1238 of at least 9 cm$^3$/10 min; a flexural modulus measured according to ISO 178 of at least 3000 MPa; a notched Izod impact strength measured according to ASTM D256 of at least 250 J/m; and a gloss measured according to ASTM D2457 (at 60°) of at least 40.

The first poly(aliphatic ester)-polycarbonate copolymer may contain from about 2 to about 13 mol % of aliphatic ester units, including from about 6 to about 8 mol %. The first poly(aliphatic ester)-polycarbonate copolymer may contain from about 87 to about 98 mol % of carbonate units derived from bisphenol-A. The aliphatic ester units may be derived from sebacic acid.

Also disclosed are articles made from such compositions, particularly wherein the article is part of a cellphone, a MP3 player, a computer, a laptop, a camera, a video recorder, an electronic tablet, a hand receiver, a kitchen appliance, or an electrical housing.

Also disclosed in embodiments is a composition comprising: a first poly(aliphatic ester)-polycarbonate copolymer having a weight average molecular weight of from about 15,000 to about 25,000; a second poly(aliphatic ester)-polycarbonate copolymer having a weight average molecular weight of from about 30,000 to about 40,000; a polysiloxane-polycarbonate copolymer; and about 10 wt % of glass fibers; wherein a weight ratio of the first poly(aliphatic ester)-polycarbonate copolymer to the second poly(aliphatic ester)-polycarbonate copolymer is at least 2:1; and wherein the composition exhibits a melt volume rate measured according to ASTM D1238 of at least 9 cm$^3$/10 min; a flexural modulus measured according to ISO 178 of at least 3000 MPa; a notched Izod impact strength measured according to ASTM D256 of at least 250 J/m; and a gloss measured according to ASTM D2457 (at 60°) of at least 40.

The composition may contain up to about 65 wt % of the first poly(aliphatic ester)-polycarbonate copolymer. Also disclosed are articles made from such composition.

Also disclosed in embodiments is an article made from a composition comprising: a first poly(aliphatic ester)-polycarbonate copolymer having a weight average molecular weight of from about 15,000 to about 25,000; a second poly(aliphatic ester)-polycarbonate copolymer having a weight average molecular weight of from about 30,000 to about 40,000; a polysiloxane-polycarbonate copolymer; and about 20 wt % of glass fibers; wherein a weight ratio of the first poly(aliphatic ester)-polycarbonate copolymer to the second poly(aliphatic ester)-polycarbonate copolymer is at least 1:1; and wherein the composition exhibits a melt volume rate measured according to ASTM D1238 of at least 4 cm$^3$/10 min; a flexural modulus measured according to ISO 178 of at least 5000 MPa; and a notched Izod impact strength measured according to ASTM D256 of at least 190 J/m.

Various embodiments of a composition are disclosed which comprise: a first poly(aliphatic ester)-polycarbonate copolymer having a weight average molecular weight of from about 15,000 to about 25,000; a second poly(aliphatic ester)-polycarbonate copolymer having a weight average molecular weight of from about 30,000 to about 40,000; a polysiloxane-polycarbonate copolymer; and about 30 wt % of glass fibers; wherein a weight ratio of the first poly(aliphatic ester)-polycarbonate copolymer to the second poly(aliphatic ester)-polycarbonate copolymer is at least 1:1; and wherein the composition exhibits a melt volume rate measured according to ASTM D1238 of at least 4 cm$^3$/10 min; a flexural modulus measured according to ISO 178 of at least 5500 MPa; and a notched Izod impact strength measured according to ASTM D256 of at least 90 J/m.

In more particular embodiments, the composition exhibits a melt volume rate measured according to ASTM D1238 of at least 4 cm$^3$/10 min; a flexural modulus measured according to ISO 178 of at least 6000 MPa; and a notched Izod impact strength measured according to ASTM D256 of at least 150 J/m. Also disclosed are articles made from these compositions.

Also disclosed is a composition comprising: about 36 wt % of a first poly(aliphatic ester)-polycarbonate copolymer having a weight average molecular weight of from about 15,000 to about 25,000; about 24 wt % of a second poly(aliphatic ester)-polycarbonate copolymer having a weight average molecular weight of from about 30,000 to about 40,000; about 20 wt % of a polysiloxane-polycarbonate copolymer; and about 20 wt % of glass fibers; wherein the composition exhibits a melt volume rate measured according to ASTM D1238 of at least 4 cm$^3$/10 min; a flexural modulus measured according to ISO 178 of at least 500 MPa; a notched Izod impact strength measured according to ASTM D256 of at least 150 J/m; and a gloss measured according to ASTM D2457 (at 60°) of at least 40.

These and other non-limiting characteristics are more particularly described below.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium, and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e. one or more hydrogen atoms is replaced) or unsubstituted. Exemplary alkyl groups include, but are not limited to, methyl, ethyl, and isopropyl. It should be noted that alkyl is a subset of aliphatic.

The term "aromatic" refers to an array of atoms having a valence of at least one and comprising at least one aromatic group. The array of atoms may include heteroatoms such as nitrogen, sulfur, selenium, silicon, and oxygen, or may be composed exclusively of carbon and hydrogen. Aromatic groups may be substituted or unsubstituted. Exemplary aromatic groups include, but are not limited to, phenyl, pyridyl, furanyl, thienyl, naphthyl, and biphenyl.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms). It should be noted that aryl is a subset of aromatic.

The term "cycloaliphatic" refers to an array of atoms which is cyclic but which is not aromatic. The cycloaliphatic group may include heteroatoms such as nitrogen, sulfur, selenium, silicon, and oxygen in the ring, or may be composed exclusively of carbon and hydrogen. A cycloaliphatic group may comprise one or more noncyclic components. For example, a cyclohexylmethyl group ($C_6H_{11}CH_2$—) is a cycloaliphatic functionality, which comprises a cyclohexyl ring (the array of atoms which is cyclic but which is not aromatic) and a methylene group (the noncyclic component). Cycloaliphatic groups may be substituted or unsubstituted. Exemplary cycloaliphatic groups include, but are not limited to, cyclopropyl, cyclobutyl, 1,1,4,4-tetramethylcyclobutyl, piperidinyl, and 2,2,6,6-tetramethylpiperidinyl.

The term "cycloalkyl" refers to an array of atoms which is cyclic but is not aromatic, and which is composed exclusively of carbon and hydrogen. Cycloalkyl groups may be substituted or unsubstituted. It should be noted that cycloalkyl is a subset of cycloaliphatic.

In the definitions above, the term "substituted" refers to at least one hydrogen atom on the named radical being substituted with another functional group, such as alkyl, halogen, —OH, —CN, —$NO_2$, —COOH, etc.

For thin yet large part designs of mobile devices, a high-modulus material is needed to both support the body and the display panel. The high flexural modulus reflects stiffness, or in other words that the molded part will maintain its shape. High ductility and good flow properties reflect how easily the polymeric composition can be poured into a mold for forming the shape of the part. Higher stiffness can be obtained by the addition of a mineral filler to a polymeric composition. However, the addition of mineral filler reduces the ductility and the flow properties of the polymeric composition. Even highly impact resistant polymers, such as polycarbonates, become brittle at room temperature at high filler loadings. Another conventional way of increasing stiffness is by increasing the weight average molecular weight of the polymer, but this typically also reduces the flow properties and makes it difficult to fill complex or thin-walled molds. Another concern is related to aesthetics; molded parts with mineral filler protruding from the surface are unsightly. Good flow properties can also aid in manufacturing by reducing in-mold stress which can lead to cracking. Cracking of the molded parts reduces the overall yield rate of production.

The present disclosure generally relates to polycarbonate compositions which exhibit a balance of good flow properties, good aesthetic properties, and good impact properties. The polycarbonate compositions comprise (A) at least one poly(aliphatic ester)-polycarbonate copolymer, (B) a polysiloxane-polycarbonate copolymer, and (C) glass fibers. The synergistic combination of these ingredients provides excellent impact ductility and surface aesthetics.

As used herein, the terms "polycarbonate" and "polycarbonate polymer" mean compositions having repeating structural carbonate units of the formula (1):

in which at least about 60 percent of the total number of $R^1$ groups are aromatic organic radicals and the balance thereof are aliphatic, alicyclic, or aromatic radicals. An ester unit (—COO—) is not considered a carbonate unit, and a carbonate unit is not considered an ester unit. In one embodiment, each $R^1$ is an aromatic organic radical, for example a radical of the formula (2):

$$-A^1-Y^1-A^2- \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

$$HO-A^1-Y^1-A^2-OH \qquad (3)$$

wherein $Y^1$, $A^1$ and $A^2$ are as described above. Also included are bisphenol compounds of general formula (4):

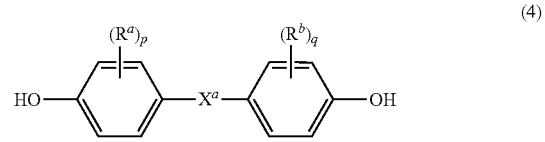

wherein $R^a$ and $R^b$ each represent a halogen atom or a monovalent hydrocarbon group and may be the same or different; p and q are each independently integers of 0 to 4; and $X^a$ represents one of the groups of formula (5):

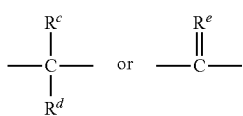
(5)

wherein $R^c$ and $R^d$ each independently represent a hydrogen atom or a monovalent linear or cyclic hydrocarbon group and $R^e$ is a divalent hydrocarbon group.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Other useful dihydroxy compounds include aromatic dihydroxy compounds of formula (6):

(6)

wherein each $R^k$ is independently a $C_{1-10}$ hydrocarbon group, and n is 0 to 4. The halogen is usually bromine. Examples of compounds that may be represented by the formula (6) include resorcinol, substituted resorcinol compounds such as 5-methyl resorcinol, 5-phenyl resorcinol, 5-cumyl resorcinol, or the like; catechol; hydroquinone; substituted hydroquinones such as 2-methyl hydroquinone, 2-t-butyl hydroquinone, 2-phenyl hydroquinone, 2-cumyl hydroquinone, 2,3,5,6-tetramethyl hydroquinone, or the like; or combinations comprising at least one of the foregoing compounds.

Polycarbonates may be branched. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %.

In specific embodiments, the dihydroxy compound used to form the polycarbonate has the structure of Formula (I):

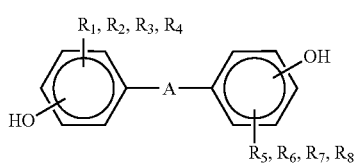
Formula (I)

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl)propane (i.e. bisphenol-A or BPA). Other illustrative compounds of Formula (I) include: 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

The polycarbonate compositions of the present disclosure contain at least two polycarbonate copolymers. First, the polycarbonate compositions of the present disclosure contain at least one poly(aliphatic ester)-polycarbonate copolymer (A). The poly(aliphatic ester)-polycarbonate copolymer is made up of a combination of carbonate units and aliphatic ester units. The molar ratio of ester units to carbonate units can vary widely, for example from 1:99 to 99:1, or more specifically from 25:75 to 75:25, depending on the desired properties of the final compositions.

In embodiments, the ester unit may have the structure of Formula (II):

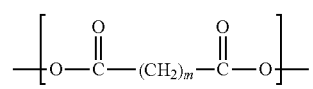
Formula (II)

wherein m is from about 4 to about 18. In some embodiments, m is from about 8 to about 10. The ester units may be derived from a $C_6$-$C_{20}$ aliphatic dicarboxylic acid (which includes the terminal carboxylate groups) or a reactive derivative thereof, including a $C_8$-$C_{12}$ aliphatic dicarboxylic acid. In some embodiments, the terminal carboxylate groups are derived from the corresponding dicarboxylic acid or reactive derivative thereof, such as the acid halide (specifically, the acid chloride), an ester, or the like. Exemplary dicarboxylic acids (from which the corresponding acid chlorides may be derived) include $C_6$ dicarboxylic acids such as hexanedioic acid (also referred to as adipic acid); $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_6$-$C_{20}$ range may be used.

A specific embodiment of the poly(aliphatic ester)-polycarbonate copolymer having ester units comprising a straight chain methylene group and a polycarbonate group is shown in Formula (III):

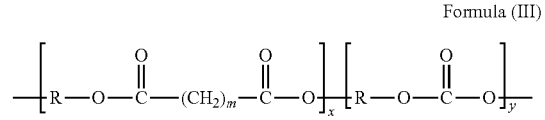
Formula (III)

where m is 4 to 18; x and y represent average molar percentages of the aliphatic ester units and the carbonate units in the copolymer. The average molar percentage ratio x:y may be from 99:1 to 1:99, including from about 13:87 to about 2:98, or from about 9:91 to about 2:98 or from about 8:92 to 13:87. Each R may be independently derived from a dihydroxy compound. In a specific exemplary embodiment, a useful poly(aliphatic ester)-polycarbonate copolymer comprises sebacic acid ester units and bisphenol A carbonate units (Formula (II), where m is 8, and the average molar ratio of x:y is 6:94). Such poly(aliphatic ester)-polycarbonate copolymers are commercially available as LEXAN HFD copolymers (LEXAN is a trademark of SABIC Innovative Plastics IP B.V.).

In some embodiments, the poly(aliphatic ester) polycarbonate copolymer may have a weight average molecular weight of from about 15,000 to about 40,000, including from about 20,000 to about 38,000 (measured by GPC based on BPA polycarbonate standards). The polycarbonate compositions of the present disclosure may include from about 30 wt % to about 85 wt % of the poly(aliphatic ester)-polycarbonate copolymer.

In some embodiments of the present disclosure, the polycarbonate composition includes two poly(aliphatic ester)-polycarbonate copolymers, i.e. a first poly(aliphatic ester)-polycarbonate copolymer (A1) and a second poly(aliphatic ester)-polycarbonate copolymer (A2). The two poly(aliphatic ester)-polycarbonate copolymers may have the same or different ester unit and the same or different carbonate unit.

The second poly(aliphatic ester)-polycarbonate copolymer has a greater weight average molecular weight than the first poly(aliphatic ester)-polycarbonate copolymer. The first poly(aliphatic ester)-polycarbonate copolymer may have a weight average molecular weight of from about 15,000 to about 25,000, including from about 20,000 to about 22,000 (measured by GPC based on BPA polycarbonate standards). Referring to Formula (III), the first poly(aliphatic ester)-polycarbonate copolymer may have an average molar percentage ratio x:y of from about 4:96 to about 7:93. The second poly(aliphatic ester)-polycarbonate copolymer may have a weight average molecular weight of 30,000 to about 40,000, including from about 35,000 to about 38,000 (measured by GPC based on BPA polycarbonate standards). Referring to Formula (III), the second poly(aliphatic ester)-polycarbonate copolymer may have an average molar percentage ratio x:y of from about 7:93 to about 13:87. In embodiments, the weight ratio of the first poly(aliphatic ester)-polycarbonate copolymer to the second poly(aliphatic ester)-polycarbonate copolymer may be at least 1:1, and in further embodiments is at least 2:1, at least 3:1, or at least 4:1. In some embodiments, the weight ratio is from about 3:2 to about 15:1 (i.e. from about 1.5 to about 15). Note the weight ratio described here is the ratio of the amounts of the two copolymers in the composition, not the ratio of the molecular weights of the two copolymers. The weight ratio between the two poly(aliphatic ester)-polycarbonate copolymers will affect the flow properties, ductility, and surface aesthetics of the final composition. The compositions may include from about 55 to about 85 wt % of the first poly(aliphatic ester)-polycarbonate copolymer (i.e. the lower Mw copolymer) and the second poly(aliphatic ester)-polycarbonate copolymer (i.e. the higher Mw copolymer) combined. The composition may contain from about 15 to about 75 wt % of the first poly(aliphatic ester)-polycarbonate copolymer. The composition may contain from about 5 to about 50 wt % of the second poly(aliphatic ester)-polycarbonate copolymer. In specific embodiments, the composition contains from about 35 to about 75 wt % of the first poly(aliphatic ester)-polycarbonate copolymer and from about 5 to about 30 wt % of the second poly(aliphatic ester)-polycarbonate copolymer.

The polycarbonate compositions of the present disclosure also contain a polysiloxane-polycarbonate copolymer (B). This copolymer comprises polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (7) (sometimes referred to herein as 'siloxane'):

(7)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer. Generally, D may have an average value of 2 to about 1000, specifically about 2 to about 500, more specifically about 30 to about 100, or from about 35 to about 55. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer. D may be referred to as the siloxane block chain length.

In one embodiment, the polydiorganosiloxane blocks are provided by repeating structural units of formula (8):

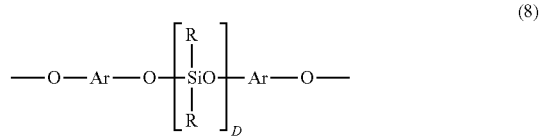

(8)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (8) may be derived from a $C_6$-$C_{30}$ dihydroxyarylene compound, for example a dihydroxyarylene compound of formula (3), (4), or (6) above. Combinations comprising at least one of the foregoing dihydroxyarylene compounds may also be used.

Such units may be derived from the corresponding dihydroxy compound of the following formula (9):

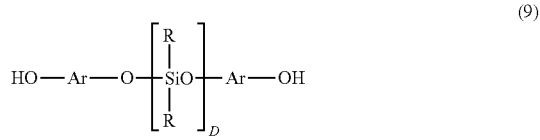

(9)

wherein Ar and D are as described above. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (10):

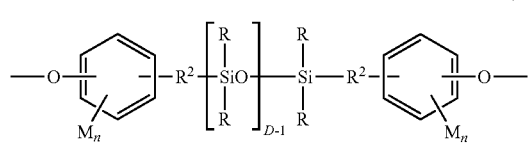

wherein R and D are as defined above. $R^2$ in formula (10) is a divalent $C_2$-$C_8$ aliphatic group. Each M in formula (10) may be the same or different, and may be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl or tolyl. In another embodiment, R is methyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (11):

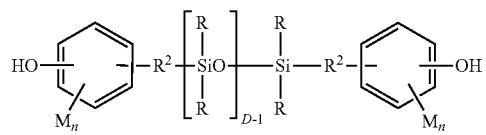

wherein R, D, M, $R^2$, and n are as described above.

Such dihydroxy polysiloxanes can be made by effecting a platinum catalyzed addition between a siloxane hydride of the formula (12),

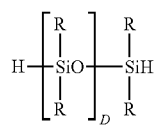

wherein R and D are as previously defined, and an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

In specific embodiments, where Ar of formula (8) is derived from resorcinol, the polydiorganosiloxane repeating units are derived from polysiloxane bisphenols of formula (13):

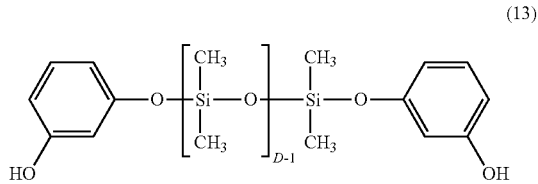

or, where Ar is derived from bisphenol A, from polysiloxane bisphenols of formula (14):

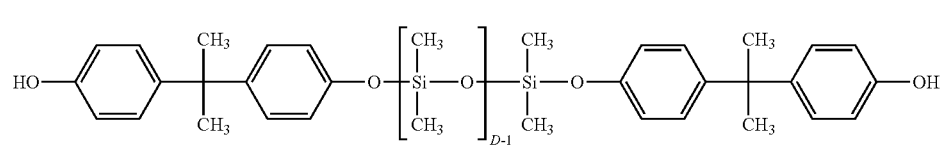

wherein D is as defined above.

In other specific embodiments, the polysiloxane units are derived from a polysiloxane bisphenol of formula (15):

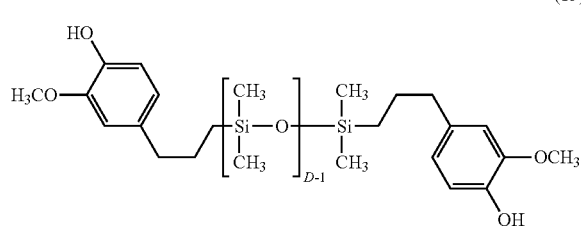

wherein D is as described in formula (7).

In yet other specific embodiments, the polysiloxane units are derived from polysiloxane bisphenol of formula (16):

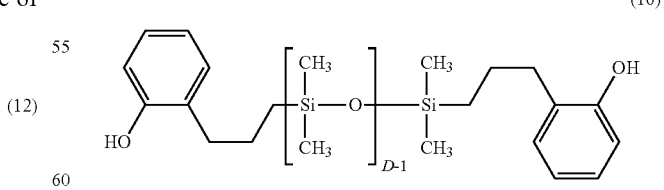

wherein D is as described in formula (7).

The siloxane blocks may make up from greater than zero to about 25 wt % of the polysiloxane-polycarbonate copolymer, including from 4 wt % to about 25 wt %, from about 4 wt % to about 10 wt %, or from about 15 wt % to about 25 wt %. The polycarbonate blocks may make up from about 75 wt % to less than 100 wt % of the block copolymer, including from about 75 wt % to about 85 wt %. It is specifically contemplated that the polysiloxane-polycarbonate copolymer is a diblock copolymer. The polysiloxane-polycarbonate copolymer may have a weight average molecular weight of from about 28,000 to about 32,000. The polycarbonate compositions of the present disclosure may include from greater than 0 to about 30 wt % of the polysiloxane-polycarbonate copolymer, including from about 5 wt % to about 25 wt % and from about 9 wt % to about 20 wt %. In particular embodiments, the composition comprises from about 0.5 wt % to about 6 wt % of siloxane originating from the polysiloxane-polycarbonate copolymer. However, the amount (by weight) of polysiloxane-polycarbonate copolymer is less than the amount of poly (aliphatic ester)-polycarbonate copolymer (A), usually by at least 10 wt % or by at least 20 wt % of the composition. Alternatively, the amount of polysiloxane-polycarbonate copolymer can be defined by the total siloxane block content that it contributes to the overall polycarbonate composition. In embodiments, the composition may have a siloxane block content of from about 0.5 wt % to about 5 wt % based on the total weight of the composition, including from about 0.9 wt % to about 4.0 wt %, or from about 2.0 wt % to about 3.0 wt %. Exemplary commercially available polysiloxane-polycarbonate copolymers are sold under the mark LEXAN® EXL by SABIC Innovative Plastics IP B. V.

The poly(aliphatic ester)-polycarbonate copolymer (A) may contain additional monomers if desired. Similarly, the polysiloxane-polycarbonate copolymer (B) may contain additional monomers if desired. These polycarbonate copolymers can be manufactured by processes known in the art, such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polycarbonate compositions of the present disclosure also comprise glass fibers (C). The term "glass" here refers generally to a material, natural or synthetic, which contains silicon dioxide ($SiO_2$) or silica as its main material. The glass fibers may be textile glass fibers such as E, A, C, ECR, R, S, D, and/or NE glass fibers, and are desirably E type glass fibers. The glass fibers may have an average length of from about 2 mm to about 5 mm, including from about 2 mm to about 4 mm. The glass fibers may have an average diameter of from about 12 microns to about 15.5 microns, including from about 12 microns to about 14 microns. The glass fibers may be present in the compositions of the present disclosure in amounts of from about 5 to about 35 wt %. In some embodiments, the compositions comprise from about 10 to about 30 wt % of the glass fibers, including from about 10 wt % to about 20 wt %. The glass fibers can also be optionally coated with coatings such as an epoxy coating, polyvinyl acetate, particular polyester resins, starch, acrylic resins, melamine, polyvinyl chloride, polyethylene oxide, polyurethane, polyepoxide, or polyvinyl alcohol, or a silane coupling agent, to change the bonding properties between the glass fibers and the other polymeric ingredients in the polycarbonate composition. The glass fibers can be either bonding or non-bonding glass fibers.

The polycarbonate composition may, in some embodiments, further comprise an impact modifier (D). The impact modifier may include an elastomer-modified graft copolymer comprising (i) an elastomeric (i.e., rubbery) polymer substrate having a glass transition temperature (Tg) less than about 10° C., more specifically less than about −10° C., or more specifically about −40° C. to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. As used herein, the terminology "(meth)acrylate monomers" refers collectively to acrylate monomers and methacrylate monomers.

A specific impact modifier of this type is a methyl methacrylate-butadiene-styrene (MBS) impact modifier wherein the butadiene substrate is prepared using above-described sulfonates, sulfates, or phosphates as surfactants. Other exemplary elastomer-modified graft copolymers include acrylonitrile-butadiene-styrene (ABS), acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to about 50 wt %, optionally greater than or equal to about 60 wt % by weight of the graft polymer. The rubber is desirably present in an amount less than or equal to about 95 wt %, optionally less than or equal to about 90 wt % of the graft polymer.

A mixture of grafting monomers may also be used, to provide a graft copolymer. An example of a suitable mixture comprises a monovinylaromatic hydrocarbon and an acrylic monomer. Examples of graft copolymers suitable for use include, but are not limited to, acrylonitrile-butadiene-styrene (ABS) and methacrylonitrile-butadiene-styrene (MBS) resins. Suitable high-rubber acrylonitrile-butadiene-styrene resins are available from SABIC Innovative Plastics (formerly General Electric Company) as BLENDEX® grades 131, 336, 338, 360, and 415.

In this regard, the polycarbonate composition may have a softblock content of less than 3.5 wt % of the overall composition. In this regard, the softblock content refers to the portion of a polymer or a composition that is formed from elastomeric material. It is believed that the softblock content is proportional to the impact performance of the overall composition. For example, in a polysiloxane-polycarbonate copolymer, the siloxane blocks may be considered to contribute to the softblock content of the composition because of their elastomeric quality, in contrast to the rigid quality of the polycarbonate blocks.

In embodiments, the polycarbonate composition comprises from about 50 wt % to about 90 wt % of the poly (aliphatic ester)-polycarbonate copolymer (A); from about 2 wt % to about 25 wt % of the polysiloxane-polycarbonate copolymer (B); and from about 5 wt % to about 35 wt % of the glass fibers (C). When present, the impact modifier (D) may be present in the amount of from about 2 wt % to about 8 wt %. These values are based on the total weight of the composition. It should be noted that the at least one poly(aliphatic ester)-polycarbonate copolymer (A) may be a blend of two or more polycarbonate copolymers having different weight average molecular weights, and the recited about 50 wt % to about 90 wt % refers to the total amount of such polycarbonate copolymers (A) in the composition.

In additional embodiments, the polycarbonate composition comprises from about 35 wt % to about 75 wt % of the poly(aliphatic ester)-polycarbonate copolymer (A1) having a Mw of from about 15,000 to about 25,000; from about 5 wt % to about 30 wt % of the poly(aliphatic ester)-polycarbonate copolymer (A2) having a Mw of from about 30,000 to about 40,000; from about 9 wt % to about 20 wt % of the polysiloxane-polycarbonate copolymer (B); and from about 10 wt % to about 20 wt % of the glass fibers (C); wherein the weight ratio of copolymer (A1) to copolymer (A2) is from about 3:2 to about 15:1.

The polycarbonate compositions of the present disclosure have a combination of good impact strength, good flow properties, and good aesthetics as measured by gloss.

The polycarbonate compositions of the present disclosure may have a melt volume rate (MVR) at least 2 cc/10 minutes when measured according to ASTM D1238 at 300° C. and a 1.2 kg load. In some embodiments, the MVR is at least 4 cc/10 minutes, at least 7 cc/10 minutes, or at least 15 cc/10 minutes. The MVR may reach a maximum of about 20 cc/10 minutes.

The polycarbonate compositions of the present disclosure may exhibit a notched Izod impact strength (NTT) measured according to ASTM D256 of at least 90 J/m, when measured at 23° C., 5 lbf, and 3.2 mm thickness. In some embodiments, the notched Izod impact strength of the composition is at least 100 J/m, including at least 200 J/m, at least 250 J/m, or at least 300 J/m. The notched Izod impact strength may reach a maximum of about 350 J/m.

The polycarbonate compositions may exhibit a gloss measured according to ASTM D2457 (at 60°) of at least 40, including at least 60. The gloss may reach a maximum of about 95.

The polycarbonate compositions of the present disclosure may have a flexural modulus of at least 3000 MPa when measured according to ISO 178, including at least 3500 MPa, at least 4000 MPa, or at least 5000 MPa. The flexural modulus have reached a maximum of 7000 MPa.

The polycarbonate compositions of the present disclosure may have any combination of these properties (MVR, (NII, gloss, flexural modulus), and any combination of the listed values for these properties. It should be noted that some of the properties (e.g. NII) are measured using articles made from the polycarbonate composition; however, such properties are described as belonging to the polycarbonate composition for ease of reference.

In some embodiments, the composition exhibits a melt volume rate measured according to ASTM D1238 of at least 4 $cm^3$/10 min; and a notched Izod impact strength measured according to ASTM D256ASTM D256 of at least 150 J/m.

In other specific embodiments, the composition exhibits a melt volume rate measured according to ASTM D1238 of at least 2 $cm^3$/10 min; a flexural modulus measured according to ISO 178 of at least 3000 MPa; a notched Izod impact strength measured according to ASTM D256ASTM D256 of at least 90 J/m; and a gloss measured according to ASTM D2457 (at 60°) of at least 40.

In some other specific combinations, the polycarbonate composition has a melt volume rate (MVR) of from about 2 to about 20; a flexural modulus of from 3000 MPa to about 5000 MPa; and a notched Izod impact strength of from about 200 J/m to about 350 J/m.

In yet other embodiments, the polycarbonate composition exhibits a melt volume rate measured according to ASTM D1238 of at least 4 $cm^3$/10 min; a flexural modulus measured according to ISO 178 of at least 3000 MPa; and a notched Izod impact strength measured according to ASTM D256 of at least 200 J/m.

In some additional embodiments, the polycarbonate composition exhibits a melt volume rate measured according to ASTM D1238 of at least 4 $cm^3$/10 min; a flexural modulus measured according to ISO 178 of at least 3500 MPa; and a notched Izod impact strength measured according to ASTM D256 of at least 250 J/m.

In still another set of embodiments, the polycarbonate composition exhibits a melt volume rate measured according to ASTM D1238 of at least 9 $cm^3$/10 min; a flexural modulus measured according to ISO 178 of at least 3000 MPa; and a notched Izod impact strength measured according to ASTM D256 of at least 250 J/m.

Other additives ordinarily incorporated in polycarbonate compositions of this type can also be used, with the proviso that the additives are selected so as to not significantly adversely affect the desired properties of the polycarbonate. Combinations of additives can be used. Such additives can be mixed at a suitable time during the mixing of the components for forming the composition. In embodiments, one or more additives are selected from at least one of the following: UV stabilizing additives, thermal stabilizing additives, mold release agents, colorants, and gamma-stabilizing agents.

Exemplary antioxidant additives include, for example, organophosphites such as tris(nonyl phenyl)phosphite, tris(2, 4-di-t-butylphenyl)phosphite (e.g., "IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 wt % of the overall polycarbonate composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 wt % of the overall polycarbonate composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 wt % of the overall polycarbonate composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 wt % of the overall polycarbonate composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 wt %, specifically 0.01 to 0.75 wt %, more specifically 0.1 to 0.5 wt % of the overall polycarbonate composition.

Colorants such as pigment and/or dye additives can also be present in order to offset any color that may be present in the polycarbonate resin and to provide desired color to the customer. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. In particular, the titanium dioxide may be uncoated or coated with an inorganic coating (e.g. alumina) or an organic coating (e.g. polysiloxane). Pigments are generally used in amounts of 0.01 to 10 wt % of the overall polycarbonate composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes; indanthrone dyes; phthalocyanine dyes; oxazine dyes; carbostyryl dyes; naphthalen tetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenyl)-5-(4-t-butylphenyl)-1,3,4-oxadiazole; 2,5-bis-(4-biphenyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 wt % of the overall polycarbonate composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 wt % of the overall polycarbonate composition.

Shaped, formed, or molded articles comprising the polycarbonate compositions are also provided. The polycarbonate compositions may be molded into useful shaped articles by a variety of means such as injection molding, overmolding, extrusion, rotational molding, blow molding and thermoforming to form various molded articles. Such articles may include thin-walled articles for consumer goods like cellphones, MP3 players, computers, laptops, cameras, video recorders, electronic tablets, hand receivers, kitchen appliances, electrical housings, etc., e.g. a smart meter housing, and the like; electrical connectors, and components of lighting fixtures, ornaments, home appliances, roofs, greenhouses, sun rooms, swimming pool enclosures, Light Emitting Diodes (LEDs) and light panels, extruded film and sheet articles; electrical parts, such as relays; and telecommunications parts such as parts for base station terminals. The present disclosure further contemplates additional fabrication operations on said articles, such as, but not limited to, molding, in-mold decoration, baking in a paint oven, lamination, and/or thermoforming. The polycarbonate compositions are especially useful for making walls that have a thickness of at least 0.3 mm and less than 1 mm.

The following examples are provided to illustrate the polycarbonate compositions, articles, and methods of the present disclosure. The examples are merely illustrative and are not intended to limit the disclosure to the materials, conditions, or process parameters set forth therein.

EXAMPLES

Table 1 lists the names and descriptions of the ingredients used in the following Examples.

TABLE 1

| Ingredient | Description | Mw | Trade name | Supplier |
|---|---|---|---|---|
| PAEBPA$_{low}$ | Sebacic acid-bisphenol A copolymer, 6.0 mol % sebacic acid, PCP (p-cumylphenol) endcapped | 21,400 | LEXAN | SABIC Innovative Plastics |
| PAEBPA$_{high}$ | Sebacic acid-bisphenol A copolymer, 8.5 mol % sebacic acid, PCP (p-cumylphenol) endcapped | 36,500 | LEXAN | SABIC Innovative Plastics |
| PC$_{low}$ | Bisphenol A homopolymer, PCP (p-cumylphenol) endcapped | 21,800 | LEXAN | SABIC Innovative Plastics |
| PC$_{high}$ | Bisphenol A homopolymer, PCP (p-cumylphenol) endcapped | 30,500 | LEXAN | SABIC Innovative Plastics |
| PC-Si | BPA polycarbonate-polydimethylsiloxane copolymer comprising about 20% by weight of siloxane, 80% by weight of BPA, PCP (p-cumylphenol) endcapped, siloxane chain length is about 35-55 | 30,000 | LEXAN | SABIC Innovative Plastics |
| MBS | Methacrylate-butadiene-styrene terpolymer (impact modifier) | | EXL2691A | Rohm Haas |
| ABS | Acrylonitrile butadiene styrene (impact modifier) | | NA | SABIC Innovative Plastics |
| S2001 | Silicone-acrylic-rubber based impact modifier | | METABLEN S-2001 | Mitsubishi Rayon |
| Glass fibers | Non-bonding | N/A | Glass Fiber NEG EX1026 non-bonding | Nippon Electric Glass |
| CB | Carbon black | | BP800 | Cabot |
| TiO$_2$ | Titanium dioxide (coated) | | KRONOS 2450 | Kronos |
| PETS | Pentaerythritol tetrastearate, >90% esterified, mold release agent | | | |
| ADR 4368 | Chain extender | About 6,800 | JONCRYL | BASF |
| Phosphites | Stabilizers | | Irgafos 168 | Ciba |

The compositions described below were compounded and molded using the conditions listed in Tables 2 and 3. The polycarbonate powders were pre-blended with the other ingredients except for the glass fibers. The pre-blended powders were extruded using a twin-screw extruder. The glass fibers were fed in a separate feeder during extrusion. The compounding conditions are listed in Table 2. The molding conditions are listed in Table 3.

TABLE 2

| Setting | Unit | Value |
|---|---|---|
| Barrel size | mm | 1500 |
| Die | mm | 430 |
| Zone 1 Temp | ° C. | 50 |
| Zone 2 Temp | ° C. | 100 |

TABLE 2-continued

| Setting | Unit | Value |
| --- | --- | --- |
| Barrel Temp | °C. | 280 |
| Die Temp | °C. | 280 |
| Screw speed | rpm | 400 |
| Throughput | Kg/hr | 40 |
| Torque | % | 47 |
| Vacuum 1 | MPa | 0.8 |

TABLE 3

| Step | Unit | Value |
| --- | --- | --- |
| Pre-drying time | Hour | 3 |
| Pre-drying temp | °C. | 120 |
| Hopper temp | °C. | 50 |
| Zone 1 temp | °C. | 275 |
| Zone 2 temp | °C. | 290 |
| Zone 3 temp | °C. | 300 |
| Nozzle temp | °C. | 300 |
| Mold temp | °C. | 100 |
| Screw speed | rpm | 80 |
| Back pressure | kgf/cm² | 70 |
| Injection speed | mm/s | 20 |
| Holding pressure | kgf/cm² | 1800 |
| Transfer pressure | kgf/cm² | 2000 |

The MVR was tested using ASTM D1238 at 300° C., 1.2 kg load.

The notched Izod impact strength (NII) was measured using ASTM D256, 5 lbf, 23° C., and 3.2 mm thickness.

Examples E1-E3

The ingredients for nine Comparative Examples C1-C9 and three Examples E1-E3 are listed in Tables 4A and 4B below. It should be noted that carbon black was added as 0.3 phr; for every 100 grams of resin, 0.3 grams of carbon black was added.

TABLE 4A

| Ingredient | Unit | C1 | C2 | C3 | E1 | E2 | E3 |
| --- | --- | --- | --- | --- | --- | --- | --- |
| PAEBPA$_{low}$ | wt % | 72 | 0 | 54 | 54 | 52 | 49 |
| PAEBPA$_{high}$ | wt % | 18 | 0 | 36 | 26 | 23 | 21 |
| PC$_{low}$ | wt % | 0 | 55 | 0 | 0 | 0 | 0 |
| PC$_{high}$ | wt % | 0 | 25 | 0 | 0 | 0 | 0 |
| PC-Si | wt % | 0 | 11 | 0 | 10 | 10 | 20 |
| MBS | wt % | 0 | 0 | 0 | 0 | 5 | 0 |
| ABS | wt % | 0 | 0 | 0 | 0 | 0 | 0 |
| S2001 | wt % | 0 | 0 | 0 | 0 | 0 | 0 |
| Glass fibers | wt % | 10 | 9 | 10 | 10 | 10 | 10 |
| CB | phr | 0.3 | 0.3 | 0.3 | 0.3 | 0.3 | 0.3 |
| Softblock PC-Si | wt % | 0 | 1.8 | 0 | 1.7 | 1.7 | 3.3 |
| Softblock MBS | wt % | 0 | 0 | 0 | 0 | 3.9 | 0 |
| Softblock ABS | wt % | 0 | 0 | 0 | 0 | 0 | 0 |
| Softblock S2001 | wt % | 0 | 0 | 0 | 0 | 0 | 0 |
| Total Softblock | wt % | 0 | 1.8 | 0 | 1.7 | 5.6 | 3.3 |
| PAEBPA$_{low}$/PAEBPA$_{high}$ | | 4 | N/A | 1.5 | 2.1 | 2.3 | 2.3 |
| MVR | cc/10 min | 18 | 10 | 12.9 | 11.5 | 9.3 | 9.2 |
| Flex. modulus | MPa | 3330 | 3200 | 3300 | 3250 | 3140 | 3300 |
| NII | J/m | 61 | 280 | 81 | 279 | 305 | 311 |

TABLE 4B

| Ingredient | Unit | C4 | C5 | C6 | C7 | C8 | C9 |
| --- | --- | --- | --- | --- | --- | --- | --- |
| PAEBPA$_{low}$ | wt % | 54 | 54 | 54 | 54 | 54 | 54 |
| PAEBPA$_{high}$ | wt % | 32 | 30 | 31 | 31 | 30 | 30 |
| PC$_{low}$ | wt % | 0 | 0 | 0 | 0 | 0 | 0 |
| PC$_{high}$ | wt % | 0 | 0 | 0 | 0 | 0 | 0 |
| PC-Si | wt % | 0 | 0 | 0 | 0 | 0 | 0 |
| MBS | wt % | 4 | 6 | 0 | 0 | 0 | 0 |
| ABS | wt % | 0 | 0 | 5 | 5 | 0 | 0 |
| S2001 | wt % | 0 | 0 | 0 | 0 | 6 | 6 |
| Glass fibers | wt % | 10 | 10 | 10 | 10 | 10 | 10 |
| CB | phr | 0.3 | 0.3 | 0.3 | 0.3 | 0.3 | 0.3 |
| Softblock PC-Si | wt % | 0 | 0 | 0 | 0 | 0 | 0 |
| Softblock MBS | wt % | 3.1 | 4.7 | 0 | 0 | 0 | 0 |
| Softblock ABS | wt % | 0 | 0 | 3.5 | 3.5 | 0 | 0 |
| Softblock S2001 | wt % | 0 | 0 | 0 | 0 | 0 | 0 |
| Total Softblock | wt % | 3.1 | 4.7 | 3.5 | 3.5 | 0 | 0 |
| PAEBPA$_{low}$/PAEBPA$_{high}$ | | 1.7 | 1.8 | 1.7 | 1.7 | 1.8 | 1.8 |
| MVR | cc/10 min | 9.8 | 7.5 | 11.2 | 12.6 | 49 | 41 |
| Flex. modulus | MPa | 3170 | 3090 | 3140 | 3210 | 3250 | 3250 |
| NII | J/m | 274 | 268 | 274 | 260 | 80 | 88 |

Initially, comparing C1 to C3, it was seen that changing the ratio of the molecular weights of the HFD polymers did not affect the flexural modulus. A lower ratio of low MW to high MW, however, decreased the MVR about 28% and increased the NII about 33%.

Next, comparing examples C3, E1, and E3, increasing the polysiloxane-polycarbonate copolymer content (PC-Si) decreased the MVR but increased the NII. Again, the flexural modulus was not significantly affected.

Example E2 shows the effect of combining a second impact modifier (MBS) with the polysiloxane-polycarbonate copolymer. The properties of E2 and E3 are very similar, but E3 achieves the properties with a lower softblock content. In this regard, the softblock content is believed to provide the impact performance, and so obtaining the same performance with a lower softblock content is somewhat surprising. Examples E1 and E2 reflect a particularly good balance of properties.

Next, Comparative Examples C4-C9 completely replace the PC-Si with different impact modifiers. Using the polysiloxane-polycarbonate copolymer (E1, E3) achieves similar impact modification in comparison to these examples, but with a lower softblock content.

Examples E10-E13

Some examples were made to compare the results when 20 wt % of glass fibers was used instead of 10 wt %. Comparative Examples C10, C11 and Examples E10-E13 are described in Table 5 below:

TABLE 5

| Ingredient | Unit | E10 | E11 | E12 | E13 | C10 | C11 |
|---|---|---|---|---|---|---|---|
| PAEBPA$_{low}$ | wt % | 54 | 58 | 36 | 36 | 0 | 0 |
| PAEBPA$_{high}$ | wt % | 26 | 24 | 24 | 28 | 0 | 0 |
| PC$_{low}$ | wt % | 0 | 0 | 0 | 0 | 20 | 38 |
| PC$_{high}$ | wt % | 0 | 0 | 0 | 0 | 42.5 | 36 |
| PC-Si | wt % | 10 | 5 | 20 | 10 | 17.5 | 0 |
| MBS | wt % | 0 | 3 | 0 | 6 | 0 | 0 |
| S2001 | wt % | 0 | 0 | 0 | 0 | 0 | 6 |
| Glass fibers | wt % | 10 | 10 | 20 | 20 | 20 | 20 |
| CB | phr | 0.3 | 0.3 | 0.3 | 0.3 | 0.3 | 0.3 |
| Softblock PC-Si | wt % | 1.7 | 0.8 | 3.3 | 1.7 | 2.9 | 0 |
| Softblock MBS | wt % | 0 | 2.3 | 0 | 4.7 | 0 | 0 |
| Softblock S2001 | wt % | 0 | 0 | 0 | 0 | 0 | 0 |
| Total softblock | wt % | 1.7 | 3.2 | 3.3 | 6.3 | 2.9 | 0 |
| PAEBPA$_{low}$/PAEBPA$_{high}$ | | 2.1 | 2.4 | 1.5 | 1.3 | NA | NA |
| MVR | cc/10 min | 10.7 | 13.9 | 5.86 | 2.67 | 4.38 | 3.5 |
| Flex. modulus | MPa | 3540 | 3380 | 5030 | 4990 | 5130 | 5240 |
| NII | J/m | 276 | 206 | 179 | 98 | 260 | 238 |
| Gloss | % | 68.46 | 71.88 | 47.04 | 43.4 | 36.82 | 36.8 |

Comparing E12/E13 to C10/C11, it was seen that compositions containing the HFD polymers (E12/E13) exhibited higher gloss compared to BPA homopolymers (C10/C11). Example E12 reflects a good balance of properties.

Compositions E10-E13 further illustrate that the combination of PAEBPA$_{low}$ and PAEBPA$_{high}$ achieved good impact (at least 90 J/m) and surface gloss properties (at least 40). A relatively high amount of PAEBPA$_{low}$ compared to PAEBPA$_{high}$ in particular improved the flow properties.

Comparing E2 to E13 illustrates that increasing the glass fiber content decreases the MVR, increases the flexural modulus, and decreases the NII.

Examples E20-E30

Next, compositions were made containing 30 wt % glass fibers, and varied with different loadings of the polysiloxane-polycarbonate copolymer. Example Compositions E20-E30 and Comparative Example C20 are described in Tables 6A and 6B below:

TABLE 6A

| Ingredient | Unit | E20 | E21 | E22 | E23 | E24 | E25 | C20 |
|---|---|---|---|---|---|---|---|---|
| PAEBPA$_{low}$ | wt % | 0 | 16.25 | 32.5 | 0 | 16.25 | 32.5 | 0 |
| PAEBPA$_{high}$ | wt % | 65 | 48.75 | 32.5 | 60 | 43.75 | 27.5 | 0 |
| PC$_{low}$ | wt % | 0 | 0 | 0 | 0 | 0 | 0 | 59 |
| PC-Si | wt % | 5 | 5 | 5 | 10 | 10 | 10 | 11 |
| Glass fibers | wt % | 30 | 30 | 30 | 30 | 30 | 30 | 30 |
| TiO$_2$ | wt % | 5 | 5 | 5 | 5 | 5 | 5 | 5 |
| PAEBPA$_{low}$/PAEBPA$_{high}$ | | 0 | 0.3 | 1 | 0 | 0.4 | 1.2 | NA |
| MVR | cc/10 min | 5.9 | 5.81 | 8.19 | 4.17 | 6.23 | 7.14 | 11.3 |
| Flex. modulus | MPa | 6560 | 6470 | 6530 | 6220 | 6150 | 6250 | 5780 |
| NII | J/m | 94.6 | 106 | 102 | 140 | 139 | 123 | 151 |

TABLE 6B

| Ingredient | Unit | E26 | E27 | E28 | E29 | E30 |
|---|---|---|---|---|---|---|
| PAEBPA$_{low}$ | wt % | 47 | 59 | 16.25 | 32.5 | 55 |
| PAEBPA$_{high}$ | wt % | 12 | 0 | 38.75 | 22.5 | 0 |
| PC$_{low}$ | wt % | 0 | 0 | 0 | 0 | 0 |
| PC-Si | wt % | 11 | 11 | 15 | 15 | 15 |
| Glass fibers | wt % | 30 | 30 | 30 | 30 | 30 |
| TiO$_2$ | wt % | 5 | 5 | 5 | 5 | 5 |
| PAEBPA$_{low}$/PAEBPA$_{high}$ | | 3.9 | NA | 0.4 | 1.4 | NA |
| MVR | cc/10 min | 12.3 | 16.4 | 4.35 | 8.02 | 14.7 |

TABLE 6B-continued

| Ingredient | Unit | E26 | E27 | E28 | E29 | E30 |
|---|---|---|---|---|---|---|
| Flex. modulus | MPa | 5770 | 5850 | 5900 | 6030 | 5750 |
| NII | J/m | 154 | 135 | 180 | 136 | 155 |

Comparing the contents of Tables 4A-6B, it was seen that generally, increasing the glass fiber content increased the flexural modulus and decreased the NII. Increasing the glass fiber content generally decreased the MVR, but this could be compensated by changing the polycarbonate split ratio.

Comparing E21/E24E/28 and E22/E25/E29, it was seen that increasing the polysiloxane-polycarbonate copolymer content and decreasing the PAEBPA$_{high}$ decreased the MVR and decreased the flexural modulus. However, the NII generally increased. This is believed to be due to molecular weight differences. The combination of PAEBPA$_{low}$, PAEBPA$_{high}$, and PC-Si results in good balance between flow and ductile properties. Looking at E26, this effect could be maintained at PAEBPA$_{low}$/PAEBPA$_{high}$ ratios up to 4.

Comparing E28 to E29, at a given loading of polysiloxane-polycarbonate copolymer, the balance between MVR and NII can be varied by changing the PAEBPA$_{low}$/PAEBPA$_{high}$ ratio.

Examples E31-E39

Six Comparative Examples C30-C35 and Examples E31-E39 are described in Tables 7A and 7B. These compositions were made with 10 wt % glass fibers.

TABLE 7A

| Ingredient | Unit | C30 | C31 | E31 | E32 | E33 | E34 | E35 | C32 |
|---|---|---|---|---|---|---|---|---|---|
| PAEBPA$_{low}$ | wt % | 0 | 72 | 70 | 66.72 | 64.61 | 64.61 | 53.61 | 32.11 |
| PAEBPA$_{high}$ | wt % | 0 | 18 | 9.22 | 10 | 12.11 | 14.61 | 25.61 | 57.11 |
| PETS | wt % | 0 | 0 | 0.27 | 0.27 | 0.27 | 0.27 | 0.27 | 0.27 |
| ADR 4368 | wt % | 0 | 0 | 0.15 | 0.15 | 0.15 | 0.15 | 0.15 | 0.15 |
| Phosphites | wt % | 0 | 0 | 0.06 | 0.06 | 0.06 | 0.06 | 0.06 | 0.06 |
| PC-Si | wt % | 11 | 0 | 10 | 12.5 | 12.5 | 10 | 10 | 0 |
| MBS | wt % | 0 | 0 | 0 | 0 | 0 | 0 | 0 | 0 |
| Glass fibers | wt % | 9 | 10 | 10 | 10 | 10 | 10 | 10 | 10 |
| CB | wt % | 0 | 0 | 0.3 | 0.3 | 0.3 | 0.3 | 0.3 | 0.3 |
| TiO$_2$ | wt % | 0 | 0 | 0 | 0 | 0 | 0 | 0 | 0 |
| % Softblock PC-Si | wt % | 1.8 | 0 | 1.7 | 2.1 | 2.1 | 1.7 | 1.7 | 0 |
| % Softblock MBS | wt % | 0 | 0 | 0 | 0 | 0 | 0 | 0 | 0 |
| Total softblock | wt % | 1.8 | 0 | 1.7 | 2.1 | 2.1 | 1.7 | 1.7 | 0 |
| PAEBPA$_{low}$/PAEBPA$_{high}$ | | NA | 4 | 7.6 | 6.7 | 5.3 | 4.4 | 2.1 | 0.6 |
| MVR | cc/10 min | 10 | 18 | 13.7 | 12.55 | 12.02 | 11.63 | 8.94 | 5.87 |
| Flex. modulus | MPa | 3200 | 3330 | — | — | — | 3341 | 3370 | 3219 |
| NII | J/m | 280 | 61 | 214 | 235 | 250 | 257 | 305 | 298 |

TABLE 7B

| Ingredient | Unit | E36 | E37 | E38 | C33 | C34 | E39 | C35 |
|---|---|---|---|---|---|---|---|---|
| PAEBPA$_{low}$ | wt % | 72 | 57.61 | 56.26 | 53.61 | 52.26 | 63.25 | 30.76 |
| PAEBPA$_{high}$ | wt % | 9.22 | 23.61 | 22.26 | 31.61 | 30.26 | 13.27 | 55.76 |
| PETS | wt % | 0.27 | 0.27 | 0.27 | 0.27 | 0.27 | 0.27 | 0.27 |
| ADR 4368 | wt % | 0.15 | 0.15 | 0.15 | 0.15 | 0.15 | 0.15 | 0.15 |
| Phosphites | wt % | 0.06 | 0.06 | 0.06 | 0.06 | 0.06 | 0.06 | 0.06 |
| PC-Si | wt % | 5 | 5 | 5 | 0 | | 10 | |
| MBS | wt % | 3 | 3 | 3 | 4 | 4 | | |
| Glass fibers | wt % | 10 | 10 | 10 | 10 | 10 | 10 | 10 |
| CB | wt % | 0.3 | 0.3 | 0 | 0.3 | | | |
| TiO$_2$ | wt % | 0 | 0 | 3 | 0 | 3 | 3 | 3 |
| % Softblock PC-Si | wt % | 0.8 | 0.8 | 0.8 | 0 | 0.0 | 1.7 | 0.0 |
| % Softblock MBS | wt % | 2.3 | 2.3 | 2.3 | 3.1 | 3.1 | 0.0 | 0.0 |
| Total softblock | wt % | 3.2 | 3.2 | 3.2 | 3.1 | 3.1 | 1.7 | 0.0 |
| PAEBPA$_{low}$/PAEBPA$_{high}$ | | 7.8 | 2.4 | 2.5 | 1.7 | 1.7 | 4.8 | 0.6 |
| MVR | cc/10 min | 14.85 | 10.58 | 10.34 | 8.87 | 8.44 | 13.24 | 6.39 |
| Flex. modulus | MPa | — | 3140 | 3164 | 3133 | 3115 | 3233 | 3182 |
| NII | J/m | 209 | 282 | 266 | 276 | 246 | 222 | 196 |

Generally, increasing the PAEBPA$_{low}$ content led to an increase in MVR. However, once the PAEBPA$_{low}$ content was above 65 wt %, the NII decreased dramatically. In addition, E36-E38, containing both the PC-Si and MBS, had a good balance between NII and MVR. Example E31 reflects a particularly good balance of properties.

Examples E40-E53

Comparative Examples C40, C41 and Examples E40-E53 are described in Tables 8A and 8B. These Example compositions were made with 20 wt % glass fibers. Example C40 contained 38 wt % of a bisphenol-A homopolymer with a Mw of about 21,800; 35.64 wt % of a bisphenol-A homopolymer with a Mw of about 30,500; 20 wt % glass fibers; 6 wt % of a PMMA-g-PBA-co-PDMS core-shell impact modifier, 0.3 wt % of an UV absorber, and 0.06 wt % of phosphite. Examples E40, E42, and E52 reflect a particularly good balance of properties. It is expected that the flexural modulus for Examples E40-E45 and E48-50 should be between 5000 MPa and 6000 MPa.

TABLE 8A

| Ingredient | Unit | C40 | C41 | E40 | E41 | E42 | E43 | E44 | E45 |
|---|---|---|---|---|---|---|---|---|---|
| PAEBPA$_{low}$ | wt % | — | 64 | 60 | 60 | 58.36 | 57.5 | 57.344 | 56.72 |
| PAEBPA$_{high}$ | wt % | — | 16 | 5 | 6.72 | 5 | 9.22 | 7.032 | 5 |
| PETS | wt % | — | 0 | 0.27 | 0.27 | 0.27 | 0.27 | 0.27 | 0.27 |
| ADR 4368 | wt % | — | 0 | 0.15 | 0.15 | 0.15 | 0.15 | 0.15 | 0.15 |
| Phosphites | wt % | 0.06 | 0 | 0.06 | 0.06 | 0.06 | 0.06 | 0.06 | 0.06 |
| PC-Si | wt % | — | 0 | 14.22 | 12.5 | 15.86 | 12.5 | 14.844 | 17.5 |
| Glass fibers | wt % | 20 | 20 | 20 | 20 | 20 | 20 | 20 | 20 |
| CB | wt % | — | 0 | 0.3 | 0.3 | 0.3 | 0.3 | 0.3 | 0.3 |
| TiO$_2$ | wt % | — | 0 | 0 | 0 | 0 | 0 | 0 | 0 |
| % softblock | wt % | | 0 | 2.3 | 2.1 | 2.6 | 2.1 | 2.4 | 2.9 |

TABLE 8A-continued

| Ingredient | Unit | C40 | C41 | E40 | E41 | E42 | E43 | E44 | E45 |
|---|---|---|---|---|---|---|---|---|---|
| PAEBPA$_{low}$/PAEBPA$_{high}$ | | | 4 | 12 | 8.9 | 11 | 6.2 | 8.2 | 11 |
| MVR | cc/10 min | 4 | 9 | 9.33 | 9.43 | 8.96 | 8.9 | 8.53 | 8.37 |
| Flex modulus | MPa | 5240 | 5270 | — | — | — | — | — | — |
| Notched Izod | J/m | 238 | 90 | 191 | 183 | 199 | 191 | 193 | 195 |

TABLE 8B

| Ingredient | Unit | E46 | E47 | E48 | E49 | E50 | E51 | E52 | E53 |
|---|---|---|---|---|---|---|---|---|---|
| PAEBPA$_{low}$ | wt % | 55.61 | 55.61 | 55 | 55 | 55 | 54.26 | 35.61 | 33.61 |
| PAEBPA$_{high}$ | wt % | 3.61 | 12.61 | 6.72 | 11.72 | 9.22 | 11.26 | 23.61 | 45.61 |
| PETS | wt % | 0.27 | 0.27 | 0.27 | 0.27 | 0.27 | 0.27 | 0.27 | 0.27 |
| ADR 4368 | wt % | 0.15 | 0.15 | 0.15 | 0.15 | 0.15 | 0.15 | 0.15 | 0.15 |
| Phosphites | wt % | 0.06 | 0.06 | 0.06 | 0.06 | 0.06 | 0.06 | 0.06 | 0.06 |
| PC-Si | wt % | 20 | 11 | 17.5 | 12.5 | 15 | 11 | 20 | |
| Glass fibers | wt % | 20 | 20 | 20 | 20 | 20 | 20 | 20 | 20 |
| CB | wt % | 0.3 | 0.3 | 0.3 | 0.3 | 0.3 | | 0.3 | 0.3 |
| TiO$_2$ | wt % | 0 | 0 | 0 | 0 | 0 | 3 | 0 | 0 |
| % softblock | wt % | 3.3 | 1.8 | 2.9 | 2.1 | 2.5 | 1.8 | 3.3 | 0.0 |
| PAEBPA$_{low}$/PAEBPA$_{high}$ | | 15 | 4.4 | 8.2 | 4.7 | 6 | 4.8 | 1.5 | 0.7 |
| MVR | cc/10 min | 7.45 | 8.06 | 7.94 | 8.6 | 8.08 | 9.07 | 4.51 | 5.04 |
| Flex modulus | MPa | 5028 | 5165 | — | — | — | 5129 | 5021 | 5513 |
| Notched Izod | J/m | 203 | 199 | 196 | 196 | 196 | 190 | 267 | 237 |

Examples E60

Comparative Examples C60, C61 and Examples E60 are described in Table 9. These compositions were made with different impact modifiers. The PC-Si had higher NII, MVR, and flexural modulus with a lower softblock content.

TABLE 9

| Ingredient | Unit | E60 | C60 | C61 |
|---|---|---|---|---|
| PAEBPA$_{low}$ | wt % | 54 | 54 | 54 |
| PAEBPA$_{high}$ | wt % | 26 | 32 | 31 |
| PC-Si | wt % | 10 | 0 | 0 |
| MBS | wt % | 0 | 4 | 0 |
| ABS | wt % | 0 | 0 | 5 |
| Glass fibers | wt % | 10 | 10 | 10 |
| TiO$_2$ | wt % | 3 | 3 | 3 |
| Softblock PC-Si | wt % | 1.7 | 0 | 0 |
| Softblock MBS | wt % | 0 | 3.1 | 0 |
| Softblock ABS | wt % | 0 | 0 | 3.5 |
| Total softblock | wt % | 1.7 | 3.1 | 3.5 |
| PAEBPA$_{low}$/PAEBPA$_{high}$ | | 2.1 | 1.7 | 1.7 |
| MVR | cc/10 min | 12.1 | 10.8 | 11 |
| Flex. modulus | MPa | 3790 | 3500 | 3340 |
| NII | J/m | 227 | 194 | 212 |

Examples E61-E64

Examples E61-E64 are described in Table 10. These four examples reflected a good balance of properties.

TABLE 10

| Ingredient | Unit | E61 | E62 | E63 | E64 |
|---|---|---|---|---|---|
| PAEBPA$_{low}$ | wt % | 54 | 71 | 36 | 59.27 |
| PAEBPA$_{high}$ | wt % | 25.27 | 9.27 | 23.27 | 5 |
| PC-Si | wt % | 10 | 9 | 20 | 15 |
| Glass fibers | wt % | 10 | 10 | 20 | 20 |
| PETS | wt % | 0.27 | 0.27 | 0.27 | 0.27 |
| Phosphites | wt % | 0.06 | 0.06 | 0.06 | 0.06 |
| ADR 4368 | wt % | 0.1 | 0.1 | 0.1 | 0.1 |
| CB | wt % | 0.3 | 0.3 | 0.3 | 0.3 |
| PAEBPA$_{low}$/PAEBPA$_{high}$ | | 2.1 | 7.7 | 1.6 | 11.9 |

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A composition comprising:
   a first poly(aliphatic ester)-polycarbonate copolymer having a weight average molecular weight of from about 15,000 to about 40,000;
   a polysiloxane-polycarbonate copolymer present in an amount less than the weight percentage of the first poly(aliphatic ester)-polycarbonate copolymer; and
   glass fibers;
   wherein the composition has a flexural modulus measured according to ISO 178 of at least 3000 MPa,
   wherein the composition comprises up to about 75 wt % of the first poly(aliphatic ester)-polycarbonate copolymer.

2. The composition of claim 1, wherein an ester repeat unit of the first poly(aliphatic ester)-polycarbonate copolymer is derived from sebacic acid.

3. A composition comprising:
   a first poly(aliphatic ester)-polycarbonate copolymer having a weight average molecular weight of from about 15,000 to about 40,000;

a polysiloxane-polycarbonate copolymer present in an amount less than the weight percentage of the first poly(aliphatic ester)-polycarbonate copolymer; and glass fibers;

wherein the composition has a flexural modulus measured according to ISO 178 of at least 3000 MPa; where the composition further comprises a second poly(aliphatic ester)-polycarbonate copolymer; and wherein a weight average molecular weight of the second poly(aliphatic ester)-polycarbonate copolymer is greater than the weight average molecular weight of the first poly(aliphatic ester)-polycarbonate copolymer.

4. The composition of claim 3, wherein the composition has a melt volume rate measured according to ASTM D1238 of at least 4 cm³/10 min.

5. The composition of claim 3, wherein a weight ratio of the first poly(aliphatic ester)-polycarbonate copolymer to the second poly(aliphatic ester)-polycarbonate copolymer is at least 2:1.

6. The composition of claim 3, wherein the second poly(aliphatic ester)-polycarbonate copolymer has a weight average molecular weight of from about 30,000 to about 40,000.

7. The composition of claim 3, comprising from about 15 to about 75 wt % of the first poly(aliphatic ester)-polycarbonate copolymer.

8. The composition of claim 3, comprising from about 5 to about 50 wt % of the second poly(aliphatic ester)-polycarbonate copolymer.

9. The composition of claim 1, comprising from about 5 to about 35 wt % of the glass fibers.

10. The composition of claim 1, wherein the composition exhibits a gloss measured according to ASTM D2457 (at 60°) of at least 40.

11. The composition of claim 1, wherein the composition exhibits a melt volume rate measured according to ASTM D1238 of at least 4 cm³/10 min; and a notched Izod impact strength measured according to ASTM D256 of at least 150 J/m.

12. The composition of claim 1, wherein the composition exhibits a melt volume rate measured according to ASTM D1238 of at least 4 cm³/10 min; a flexural modulus measured according to ISO 178 of at least 3000 MPa; and a notched Izod impact strength measured according to ASTM D256 of from about 150 J/m to about 300 J/m.

13. The composition of claim 1, A composition comprising:

a first poly(aliphatic ester)-polycarbonate copolymer having a weight average molecular weight of from about 15,000 to about 40,000;

a polysiloxane-polycarbonate copolymer present in an amount less than the weight percentage of the first poly(aliphatic ester)-polycarbonate copolymer; and glass fibers;

wherein the composition has a flexural modulus measured according to ISO 178 of at least 3000 MPa; and wherein the composition exhibits a melt volume rate measured according to ASTM D1238 of at least 4 cm³/10 min; a flexural modulus measured according to ISO 178 of at least 3000 MPa; and a notched Izod impact strength measured according to ASTM D256 of at least 200 J/m.

14. The composition of claim 13, wherein the composition exhibits a melt volume rate measured according to ASTM D1238 of at least 4 CM³/10 min; a flexural modulus measured according to ISO 178 of at least 3500 MPa; and a notched Izod impact strength measured according to ASTM D256 of at least 250 J/m.

15. The composition of claim 13, wherein the composition exhibits a melt volume rate measured according to ASTM D1238 of at least 9 CM³/10 min; a flexural modulus measured according to ISO 178 of at least 3000 MPa; and a notched Izod impact strength measured according to ASTM D256 of at least 250 J/m.

16. The composition of claim 1, comprising from about 5 to about 25 wt % of the polysiloxane-polycarbonate copolymer.

17. The composition of claim 1, wherein the aliphatic ester is derived from an aliphatic dicarboxylic acid that has a total of from 8 to 12 carbon atoms.

18. The composition of claim 1, wherein the first poly(aliphatic ester)-polycarbonate copolymer contains from about 2 to about 13 mol % of aliphatic ester units.

19. The composition of claim 18, wherein the first poly(aliphatic ester)-polycarbonate copolymer contains from about 87 to about 98 mol % of carbonate units derived from bisphenol-A.

20. The composition of claim 18, wherein the aliphatic ester units are derived from sebacic acid.

21. The composition of claim 1, wherein a siloxane block chain length of the polysiloxane-polycarbonate copolymer is from about 35 to about 55.

22. The composition of claim 1, wherein a siloxane block chain length of the polysiloxane-polycarbonate copolymer is from about 30 to about 100.

23. The composition of claim 1, wherein the polysiloxane-polycarbonate copolymer has a siloxane block content of from about 15 wt % to about 25 wt %.

24. A composition comprising:

a first poly(aliphatic ester)-polycarbonate copolymer having a weight average molecular weight of from about 15,000 to about 40,000;

a polysiloxane-polycarbonate copolymer present in an amount less than the weight percentage of the first poly(aliphatic ester)-polycarbonate copolymer; and glass fibers;

wherein the composition has a flexural modulus measured according to ISO 178 of at least 3000 MPa; and wherein the polysiloxane-polycarbonate copolymer has a siloxane block content of from greater than zero to about 25 wt %.

25. The composition of claim 1 wherein the composition has a total softblock content of less than 3.5 wt. %.

26. The composition of claim 1, wherein the composition comprises from about 0.5 wt % to about 6 wt % of siloxane originating from the polysiloxane-polycarbonate copolymer.

27. The composition of claim 1, wherein the glass fibers are non-bonding glass fibers.

28. An article made from composition comprising:

a first poly(aliphatic ester)-polycarbonate copolymer having a weight average molecular weight of from about 15,000 to about 40,000;

a polysiloxane-polycarbonate copolymer present in an amount less than the weight percentage of the first poly(aliphatic ester)-polycarbonate copolymer; and glass fibers;

wherein the composition has a flexural modulus measured according to ISO 178 of at least 3000 MPa, wherein the article has a wall with a thickness of at least 0.3 mm and less than 1 mm.

29. The article of claim 28, wherein the article is a part of a cellphone, a MP3 player, a computer, a laptop, a camera, a video recorder, an electronic tablet, a hand receiver, a kitchen appliance, or an electrical housing.

30. A composition comprising:
a first poly(aliphatic ester)-polycarbonate copolymer having a weight average molecular weight of from about 15,000 to about 25,000;
a second poly(aliphatic ester)-polycarbonate copolymer having a weight average molecular weight of from about 30,000 to about 40,000;
a polysiloxane-polycarbonate copolymer present in an amount less than the combined weight percentage of the first and second poly(aliphatic ester)-polycarbonate copolymers; and
glass fibers;
wherein the composition has a flexural modulus measured according to ISO 178 of at least 3000 MPa.

31. The composition of claim 30, wherein the first poly(aliphatic ester)-polycarbonate copolymer and the second poly(aliphatic ester)-polycarbonate copolymer both include ester units derived from sebacic acid.

32. The composition of claim 30, comprising from about 55 to about 85 wt % of the first poly(aliphatic ester)-polycarbonate copolymer and the second poly(aliphatic ester)-polycarbonate copolymer.

33. The composition of claim 30, wherein a weight ratio of the first poly(aliphatic ester)-polycarbonate copolymer to the second poly(aliphatic ester)-polycarbonate copolymer is from about 1.5 to about 15.

34. The composition of claim 30, wherein the first poly(aliphatic ester)-polycarbonate copolymer contains from about 4 to about 7 mol % of aliphatic ester units.

35. The composition of claim 34, wherein the first poly(aliphatic ester)-polycarbonate copolymer contains from about 93 to about 96 mol % of carbonate units derived from bisphenol-A.

36. The composition of claim 34, wherein the aliphatic ester units are derived from sebacic acid.

37. The composition of claim 30, wherein the second poly(aliphatic ester)-polycarbonate copolymer contains from about 7 to about 13 mol % of aliphatic ester units.

38. The composition of claim 30, wherein the second poly(aliphatic ester)-polycarbonate copolymer contains from about 87 to about 93 mol % of carbonate units derived from bisphenol-A.

39. The composition of claim 37, wherein the aliphatic ester units are derived from sebacic acid.

40. The composition of claim 30, wherein both the first poly(aliphatic ester)-polycarbonate copolymer and the second poly(aliphatic ester)-polycarbonate copolymer contain aliphatic ester units derived from sebacic acid and carbonate units derived from bisphenol-A.

41. A composition comprising:
from about 35 wt % to about 75 wt % of a first poly(aliphatic ester)-polycarbonate copolymer having a weight average molecular weight of from about 15,000 to about 25,000;
from about 5 wt % to about 30 wt % of a second poly(aliphatic ester)-polycarbonate copolymer having a weight average molecular weight of from about 30,000 to about 40,000;
from about 9 wt % to about 20 wt % of a polysiloxane-polycarbonate copolymer; and
from about 10 wt % to about 20 wt % of non-bonding glass fibers;
wherein the first poly(aliphatic ester)-polycarbonate copolymer and the second poly(aliphatic ester)-polycarbonate copolymer both comprise ester units derived from sebacic acid;
wherein the composition exhibits a gloss measured according to ASTM D2457 (at 60°) of at least 40.

42. The composition of claim 41, wherein the composition exhibits a melt volume rate measured according to ASTM D1238 of at least 2 cm$^3$/10 min; a flexural modulus according to ISO 178 of at least 3000 MPa; and a notched Izod impact strength measured according to ASTM D256 of at least 90 J/m.

43. The composition of claim 41, comprising from about 50 to about 65 wt % of the first poly(aliphatic ester)-polycarbonate copolymer.

44. The composition of claim 41, wherein a weight ratio of the first poly(aliphatic ester)-polycarbonate copolymer to the second poly(aliphatic ester)-polycarbonate copolymer is from about 1.5 to about 15.

45. The composition of claim 44, wherein a weight ratio of the first poly(aliphatic ester)-polycarbonate copolymer to the second poly(aliphatic ester)-polycarbonate copolymer is from about 2 to about 4.

46. A composition comprising:
a first poly(aliphatic ester)-polycarbonate copolymer having a weight average molecular weight of from about 15,000 to about 40,000;
a polysiloxane-polycarbonate copolymer present in an amount less than the weight percentage of the first poly(aliphatic ester)-polycarbonate copolymer; and
glass fibers;
wherein the composition has a flexural modulus measured according to ISO 178 of at least 3000 MPa; and wherein the composition exhibits a gloss measured according to ASTM D2457 (at 60°) of at least 40; and
wherein the composition exhibits a melt volume rate measured according to ASTM D1238 of at least 4 cm$^3$/10 min; a flexural modulus measured according to ISO 178 of at least 3500 MPa; and a notched Izod impact strength measured according to ASTM D256 of at least 250 J/m.

47. The composition of claim 46, wherein the composition contains from about 10 wt % to about 20 wt % of the glass fibers.

48. The composition of claim 46, wherein the composition exhibits a gloss measured according to ASTM D2457 (at 60°) of at least 60.

49. The composition of claim 46, further comprising a second poly(aliphatic ester)-polycarbonate copolymer;
wherein the first poly(aliphatic ester)-polycarbonate copolymer has a weight average molecular weight of from about 15,000 to about 25,000;
wherein the second poly(aliphatic ester)-polycarbonate copolymer has a weight average molecular weight of from about 30,000 to about 40,000; and
wherein the polysiloxane-polycarbonate copolymer is present in an amount less than the combined weight percentage of the first and second poly(aliphatic ester)-polycarbonate copolymers.

50. The composition of claim 46, wherein the composition exhibits a melt volume rate measured according to ASTM D1238 of at least 9 cm$^3$/10 min.

51. The composition of claim 46, wherein the first poly(aliphatic ester)-polycarbonate copolymer contains from about 6 to about 8 mol % of aliphatic ester units.

52. The composition of claim 46, wherein the first poly(aliphatic ester)-polycarbonate copolymer contains from about 2 to about 13 mol % of aliphatic ester units.

53. The composition of claim 52, wherein the first poly(aliphatic ester)-polycarbonate copolymer contains from about 87 to about 98 mol % of carbonate units derived from bisphenol-A.

54. The composition of claim 51, wherein the aliphatic ester units are derived from sebacic acid.

55. An article made from the composition of claim 46.

56. The article of claim 55, wherein the article is a part of a cellphone, a MP3 player, a computer, a laptop, a camera, a video recorder, an electronic tablet, a hand receiver, a kitchen appliance, or an electrical housing.

57. A composition comprising:
a first poly(aliphatic ester)-polycarbonate copolymer having a weight average molecular weight of from about 15,000 to about 25,000;
a second poly(aliphatic ester)-polycarbonate copolymer having a weight average molecular weight of from about 30,000 to about 40,000;
a polysiloxane-polycarbonate copolymer; and
about 10 wt % of glass fibers;
wherein a weight ratio of the first poly(aliphatic ester)-polycarbonate copolymer to the second poly(aliphatic ester)-polycarbonate copolymer is at least 2:1; and
wherein the composition exhibits a melt volume rate measured according to ASTM D1238 of at least 9 cm$^3$/10 min; a flexural modulus measured according to ISO 178 of at least 3000 MPa; a notched Izod impact strength measured according to ASTM D256 of at least 250 J/m; and a gloss measured according to ASTM D2457 (at 60°) of at least 40.

58. The composition of claim 57, containing up to about 65 wt % of the first poly(aliphatic ester)-polycarbonate copolymer.

59. An article made from the composition of claim 57.

60. An article made from a composition comprising:
a first poly(aliphatic ester)-polycarbonate copolymer having a weight average molecular weight of from about 15,000 to about 25,000;
a second poly(aliphatic ester)-polycarbonate copolymer having a weight average molecular weight of from about 30,000 to about 40,000;
a polysiloxane-polycarbonate copolymer; and
about 20 wt % of glass fibers;
wherein a weight ratio of the first poly(aliphatic ester)-polycarbonate copolymer to the second poly(aliphatic ester)-polycarbonate copolymer is at least 1:1; and
wherein the composition exhibits a melt volume rate measured according to ASTM D1238 of at least 4 cm$^3$/10 min; a flexural modulus measured according to ISO 178 of at least 5000 MPa; and a notched Izod impact strength measured according to ASTM D256 of at least 190 J/m.

61. A composition comprising:
a first poly(aliphatic ester)-polycarbonate copolymer having a weight average molecular weight of from about 15,000 to about 25,000;
a second poly(aliphatic ester)-polycarbonate copolymer having a weight average molecular weight of from about 30,000 to about 40,000;
a polysiloxane-polycarbonate copolymer; and
about 30 wt % of glass fibers;
wherein a weight ratio of the first poly(aliphatic ester)-polycarbonate copolymer to the second poly(aliphatic ester)-polycarbonate copolymer is at least 1:1; and
wherein the composition exhibits a melt volume rate measured according to ASTM D1238 of at least 4 cm$^3$/10 min; a flexural modulus measured according to ISO 178 of at least 5500 MPa; and a notched Izod impact strength measured according to ASTM D256 of at least 90 J/m.

62. The composition of claim 61, wherein the composition exhibits a melt volume rate measured according to ASTM D1238 of at least 4 cm$^3$/10 min; a flexural modulus measured according to ISO 178 of at least 6000 MPa; and a notched Izod impact strength measured according to ASTM D256 of at least 150 J/m.

63. An article made from the composition of claim 61.

64. A composition comprising:
about 36 wt % of a first poly(aliphatic ester)-polycarbonate copolymer having a weight average molecular weight of from about 15,000 to about 25,000;
about 24 wt % of a second poly(aliphatic ester)-polycarbonate copolymer having a weight average molecular weight of from about 30,000 to about 40,000;
about 20 wt % of a polysiloxane-polycarbonate copolymer; and
about 20 wt % of glass fibers;
wherein the composition exhibits a melt volume rate measured according to ASTM D1238 of at least 4 cm$^3$/10 min; a flexural modulus measured according to ISO 178 of at least 500 MPa; a notched Izod impact strength measured according to ASTM D256 of at least 150 J/m; and a gloss measured according to ASTM D2457 (at 60°) of at least 40.

65. The composition of claim 52, wherein the aliphatic ester units are derived from sebacic acid.

66. An article made from the composition of claim 58.

67. An article made from the composition of claim 62.

* * * * *